US009341855B2

(12) United States Patent
Du et al.

(10) Patent No.: US 9,341,855 B2
(45) Date of Patent: May 17, 2016

(54) POLARIZATION CONVERTER BY PATTERNED POLARIZATION GRATING

(71) Applicant: The Hong Kong University of Science and Technology, Hong Kong (CN)

(72) Inventors: Tao Du, Hong Kong (CN); Fan Fan, Hong Kong (CN); Vladimir Grigorievich Chigrinov, Hong Kong (CN); Hoi Sing Kwok, Hong Kong (CN)

(73) Assignee: The Hong Kong University of Science and Technology, Hong Kong (CN)

( * ) Notice: Subject to any disclaimer, the term of this patent is extended or adjusted under 35 U.S.C. 154(b) by 292 days.

(21) Appl. No.: 13/888,061

(22) Filed: May 6, 2013

(65) Prior Publication Data
US 2013/0301126 A1    Nov. 14, 2013

Related U.S. Application Data

(60) Provisional application No. 61/688,086, filed on May 8, 2012.

(51) Int. Cl.
G02B 27/28    (2006.01)

(52) U.S. Cl.
CPC ............ *G02B 27/286* (2013.01); *G02B 27/285* (2013.01)

(58) Field of Classification Search
CPC ............... G02B 2006/12104; G02B 6/105; G02B 27/283–27/285; G02B 27/4261
USPC .......... 359/485.05, 485.07, 489.07, 566, 569, 359/571, 626; 349/96, 98; 362/19, 326–332
See application file for complete search history.

(56) References Cited

U.S. PATENT DOCUMENTS

| 3,626,511 | A  | * | 12/1971 | Hammer ....................... 359/316 |
| 4,468,849 | A  | * | 9/1984  | Anderson et al. .......... 29/525.12 |
| 5,548,422 | A  |   | 8/1996  | Conner et al. |
| 5,815,249 | A  | * | 9/1998  | Nishi et al. ...................... 355/71 |
| 5,828,471 | A  |   | 10/1998 | Davis et al. |
| 6,177,667 | B1 | * | 1/2001  | Fujita et al. ................... 250/216 |
| 6,621,533 | B2 | * | 9/2003  | Slack et al. ....................... 349/5 |
| 6,630,289 | B1 |   | 10/2003 | Kwok et al. |
| 6,804,039 | B1 | * | 10/2004 | Doan et al. .................... 359/291 |
| 7,660,226 | B2 | * | 2/2010  | Ogata ...................... 369/112.18 |

(Continued)

FOREIGN PATENT DOCUMENTS

WO    WO 2014/159045 A1    10/2014

OTHER PUBLICATIONS

Suss MicroOptics SA, "Strategies for Beam Homogenizing," Technical Information Sheet 10—Beam Homogenizing, p. 1, http://www.suss-microoptics.com/media/downloads/SMO_TechInfo_Sheet_10.pdf, Issued Jan. 2008, Accessed Dec. 16, 2014.*

(Continued)

*Primary Examiner* — Stephone B Allen
*Assistant Examiner* — Adam W Booher
(74) *Attorney, Agent, or Firm* — Leydig, Voit & Mayer, Ltd.

(57) ABSTRACT

A polarization converter and polarization conversion systems are provided. The polarization converter and polarization conversion systems include a patterned polarization grating with left hand and right hand polarization grating domains. The polarization grating domains are configured to diffract incident non-polarized light into beams having left and right circular polarization states.

9 Claims, 6 Drawing Sheets

(56) References Cited

U.S. PATENT DOCUMENTS

| | | | |
|---|---|---|---|
| 7,692,759 | B2 | 4/2010 | Escuti et al. |
| 7,821,583 | B2 | 10/2010 | Yeh et al. |
| 2002/0167727 | A1 | 11/2002 | Hansen et al. |
| 2004/0263974 | A1 | 12/2004 | McDonough et al. |
| 2009/0122402 | A1 | 5/2009 | Shemo et al. |
| 2010/0225856 | A1 | 9/2010 | Escuti et al. |
| 2010/0225876 | A1 | 9/2010 | Escuti et al. |
| 2011/0188120 | A1 | 8/2011 | Tabirian et al. |
| 2011/0242461 | A1 | 10/2011 | Escuti et al. |
| 2011/0267483 | A1 | 11/2011 | Kanamori |

OTHER PUBLICATIONS

Le Doucen and Pellat-Finet, "Polarization properties and diffraction efficiencies of binary anisotropic gratings: general study and experiments on ferroelectric liquid crystals," Optics Communications 151, Jun. 1, 1998, p. 1, Abstract and Section 1, Introduction.*

Du et al., "Dual-domain transflective liquid crystal display using TN and L TN modes by photoalignment technology," Society for Information Display 2009 Symposium (SID'09) Digest, 406-409 (San Antonio, Texas, May 31-Jun. 5, 2009).

Du et al., "Photo patterned micro polarizer," 17th International Display Workshop (IDW'10), 565-566 (Fukuoka, Japan, Dec. 1-3, 2010).

Guo et al., "Fabrication of thin-film micropolarizer arrays for visible imaging polarimetry," Applied Optics, 39 (10): 1486-1492 (Apr. 1, 2000).

Harnett et al., "Liquid-crystal micropolarizer array for polarization-difference imaging," Applied Optics, 41 (7): 1291-1296 (Mar. 1, 2002).

Mak et al., "Photoaligned transflective liquid crystal display using low twist nematic and electricity controlled birefringence modes," Society for Information Display 2008 Symposium (SID'08) Digest, 1908-1911 (Los Angeles, California, May 18-23, 2008).

Nersisyan et al., "Axial polarizers based on dichroic liquid crystals," J. Applied Physics, 108(3): 033101-033101-5 (Published online Aug. 4, 2010).

Peeters et al., "High-Contrast thin-film polarizers by photo-crosslinking of smectic guest-host systems," Advanced Materials, 18: 2412-2417 (2006).

Stalder et al., "Linearly polarized light with axial symmetry generated by liquid-crystal polarization converters," Optics Letters, 21 (23): 1948-1950 (Dec. 1, 1996).

Yao et al., Tunable photosensitivity of alignment film for flexible liquid crystal displays, Society for Information Display 2009 Symposium (SID'09) Digest, 1630-1633 (San Antonio, Texas, May 31-Jun. 5, 2009).

Yaroshchuk et al., "Stabilization of liquid crystal photoaligning layers by reactive mesogens," Applied Physics Letters, 95: 021902-1-021902-3 (2009).

Yip et al., "Photo-patterned e-wave polarizer," Displays, 22: 27-32 (2001).

Zhao et al., "High-resolution photoaligned liquid-crystal micropolarizer array for polarization imaging in visible spectrum," Optics Letters, 34 (23): 3619-3621 (Dec. 1, 2009).

Zhao et al., "Liquid-crystal micropolarimeter array for full Stokes polarization imaging in visible spectrum," Optics Express, 18 (17): 17776-17787 (Aug. 3, 2010).

Du et al., "Photo patterned micro polarizer and method of making the same," U.S. Appl. No. 61/344,807, filed Oct. 15, 2010.

Du et al., "Polarization converter by patterned polarization grating," U.S. Appl. No. 61/,688,086, filed May 8, 2012.

* cited by examiner

POLARIZATION CONVERTER BY PATTERNED POLARIZATION GRATING

CROSS-REFERENCE TO RELATED APPLICATIONS

This patent application claims the benefit of U.S. Provisional Patent Application No. 61/688,086, filed May 8, 2012, which is incorporated by reference.

FIELD

The present invention relates to polarization converters, and particularly to a polarization converter capable of converting input non-polarized light to output linear or circular polarized light with very high efficiency.

BACKGROUND

Photoalignment technology allows the fabrication of spatially varying liquid crystal alignment patterns on photoalignment layers. One of the types of devices that may be fabricated utilizing photoalignment technology is a polarization grating (PG).

A PG is a sinusoidal phase grating made of a retardation film with spatially varying optical axis. Different from other optical gratings, a PG diffracts light into +1 and −1 diffraction order and all other higher orders are eliminated. Moreover, a PG has the highest diffraction efficiency among all diffraction gratings. Applications for PGs are devices based on diffraction optics. Conventionally, PGs are difficult to make due to the use of laser beam interference to create spatially varying alignment on the photoalignment layer, which has high sensitivity to small vibrations of equipment and to airflow.

There are different polarization converters and polarizers that convert input light with a specified polarization state to output light with another specified polarization state. The conversion efficiency is usually highly dependent on the polarization state of the input light, which means that if the input light is non-polarized, the conversion efficiency of conventional converters and polarizers will decrease significantly.

SUMMARY

Exemplary embodiments of the present invention provide polarization converters and polarization conversion systems that are able to convert input non-polarized light to a specified polarization state with efficiency close to 100%, so that it can be used to convert a non-polarized light source to a polarized light source with very high efficiency (higher than the efficiency of conventional polarizers). The polarization converters and polarization conversion systems include a patterned polarization grating with left hand and right hand polarization grating domains. The polarization grating domains are configured to diffract incident non-polarized light into beams having left and right circular polarization states. Further embodiments include further features, such as retarders, lens arrays, mirrors, and glass substrates.

BRIEF DESCRIPTION OF THE SEVERAL VIEWS OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Embodiments of the present invention provide a polarization converter that converts input non-polarized light to circular or linear polarized light with high efficiency. The polarization converter utilizes a patterned polarization grating. Conventional difficulties with respect to the manufacture of polarization gratings patterned with spatially-varying alignment on the photoalignment layer and/or multiple domains are overcome by using, for example, a one-step multi-domain photoalignment process such as described in U.S. patent application Ser. No. 13/274,127, titled "Patterned Polarization Converter," which is incorporated herein by reference in its entirety.

Figure 1:
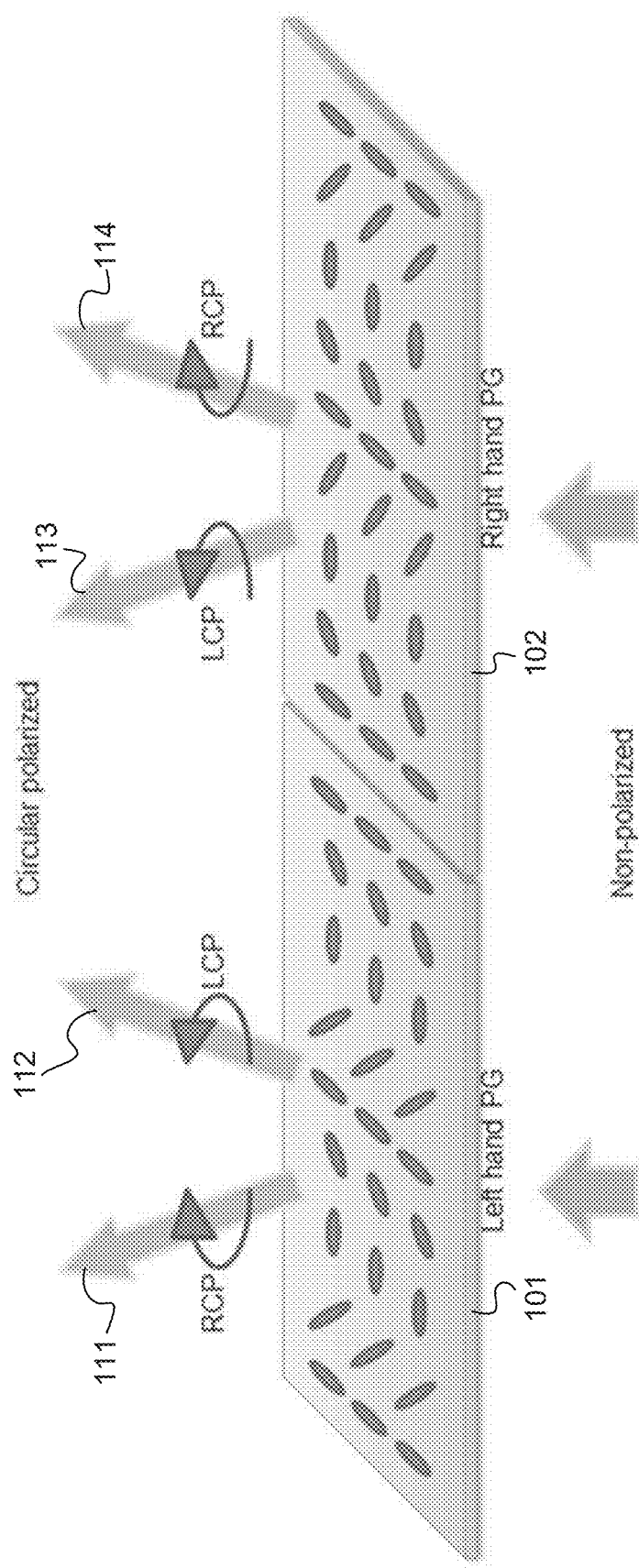
FIG. 1 is an illustrative diagram showing the functionality of a left-hand polarization grating and a right hand polarization grating.

FIG. 1 is a diagram illustrating the functionality of a left-hand polarization grating 101 (left side of FIG. 1) and a right-hand polarization grating 102 (right side of FIG. 1). As shown in FIG. 1, polarization gratings convert input non-polarized light to output left and right circular polarized light with different steering directions. A left hand polarization grating steers output of left hand circular polarized light to the right (as shown by arrow 112) and right hand circular polarized light to the left (as shown by arrow 111). A right hand polarization grating steers output of left hand circular polarized light to the left (as shown by arrow 113) and right hand circular polarized light to the right (as shown by arrow 114). It will be appreciated that the steering angle is the angle of the first diffraction order with respect to the angle of the input light beam. Like other diffraction gratings, the diffraction angle of the first order depends on the pitch of the grating.

Figure 2:
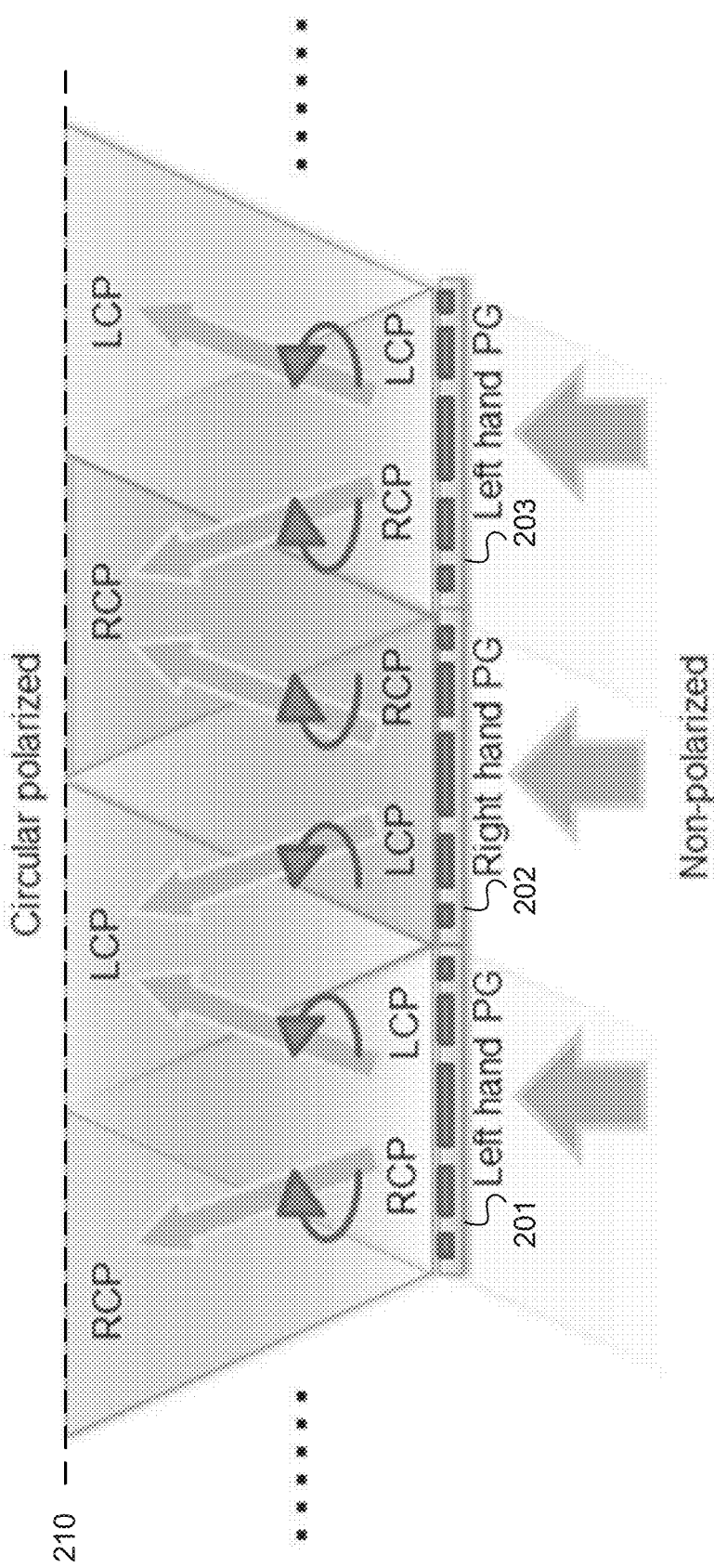
FIG. 2 is an illustrative diagram showing a portion of a polarization grating patterned with alternating left hand and right hand PG domains in an exemplary embodiment.

Turning now to FIG. 2, a portion of a polarization grating patterned with left hand PG domains 201, 203 and right hand PG domains 202 according to an exemplary embodiment of the present invention is depicted. It will be appreciated that the ellipses " . . . " on either side of the depicted portion of the patterned polarization grating indicate that the patterned polarization grating may include a plurality of such alternating left hand PG and right hand PG domains. It will be appreciated that the physical size and the number of domains can be varied. Using photoalignment technology, patterned polarization gratings may be produced, for example, having a size of the pattern as 1 um, as well as up to much larger sizes. The size can be adjusted for different designs and applications.

When collimated non-polarized light is input through the patterned polarization grating, at a certain distance above the patterned polarization grating (as indicated by dashed line 210), the output beams of left hand circular polarized light and right hand circular polarized light from the patterned polarization grating will be separated into periodical domains (alternating left hand circular polarized light and right hand circular polarized light domains as shown in FIG. 2). The distance at which the left circular polarized beam and the right circular polarized beam are fully separated depends on the pitch of the polarization grating and the size of the pattern. Although FIG. 2 shows the polarization grating with uniform alternating patterns, it will be appreciated that in a further embodiment, non-uniform PG domains may be used as well.

Figure 3:
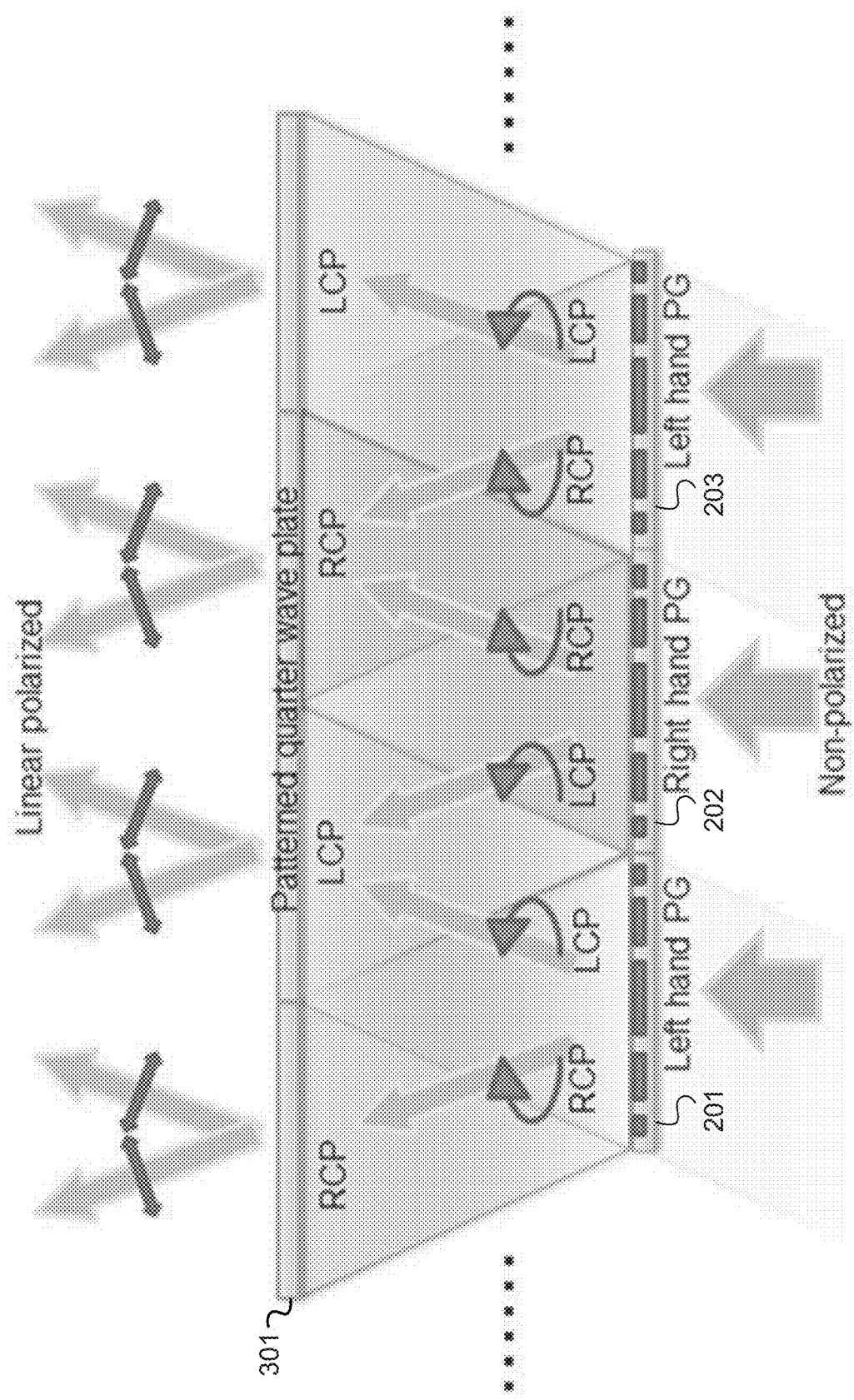
FIG. 3 is an illustrative diagram showing a polarization converter having a patterned polarization grating in an exemplary embodiment.

Turning now to FIG. 3, a patterned quarter wave plate 301 is positioned above the patterned polarization grating at the distance indicated in FIG. 2 by dashed line 210 (where the outputs of left hand circular polarized light and right hand circular polarized light are separated into periodical domains) so as to form a polarization converter according to an exemplary embodiment of the present invention. The patterned quarter wave plate is patterned to match the pattern of the patterned polarization grating, and preferably, the domain size of the patterned quarter wave plate matches the domain size of the patterned polarization grating. The patterned quarter wave plate 301 converts the output domains of left hand circular polarized light and right hand circular polarized light to linear polarized light. As shown in FIG. 3, the steering direction of the linear polarized light is based on the steering direction of the circular polarized light—i.e., the quarter wave plate only changes the polarization state of the beams while leaving the propagating direction unchanged.

Thus, it will be appreciated that the structure shown in FIG. 3 is a polarization converter according to a first exemplary embodiment of the present invention. The polarization converter includes a polarization grating with both left hand and right hand alignment domains (i.e., the left hand and right hand PG domains 201, 202, 203 of the patterned polarization grating). The left hand and right hand alignment domains have the same structure except that they are mirror images of each other—i.e., rotated by 180 degrees. In other words, given the same input non-polarized light, the output light from a right hand alignment domain is the same as the output light of the left hand polarization grating in a plane except that they are rotated 180 degrees relative to each other. The polarization converter also includes a patterned quarter wave plate with two types of domains repeating periodically that correspond to the two types of light output from the patterned polarization converter.

When non-polarized collimated light normally incidents into the polarization converter, it will first be converted into left hand and right hand circular polarized light with mirrored propagating directions by the patterned polarization converter. As discussed above, at a certain distance away from the patterned polarization grating, the left hand and right hand circular polarized light will be separated into left hand circular polarized light domains and right hand circular polarized light domains. A patterned quarter wave plate (with two types of domains corresponding to the two types of incident circular polarized light domains) is positioned at that distance such that left hand circular polarized light will incident into one domain type of the patterned quarter wave plate, and right hand circular polarized light will incident into the other domain type of the patterned quarter wave plate. The final output light from the polarization converter, having passed through the patterned quarter wave plate, will be linearly polarized light.

It will be appreciated that in an alternative embodiment, a patterned half wave plate may be used instead of a patterned quarter wave plate. If a patterned half wave plate is used, the final output light from the polarization converter will be circular polarized light (whereas with a patterned quarter wave plate the output light is linearly polarized light). It will be appreciated that the patterned half wave plate would be patterned in a similar manner as described above with respect to the patterned quarter wave plate—i.e., with two types of domains based on the patterning of the polarization grating.

The efficiency of the device depicted in FIG. 3 depends on the divergence/non-divergence of the input light. If input light is well-collimated, the device will convert most of the input light into the desired polarization state. However, if light input into the polarization converter is not well-collimated, the polarization converter will have a reduced conversion efficiency because the patterned polarization grating would not fully separate the left circular and right circular polarized light.

Figure 4:
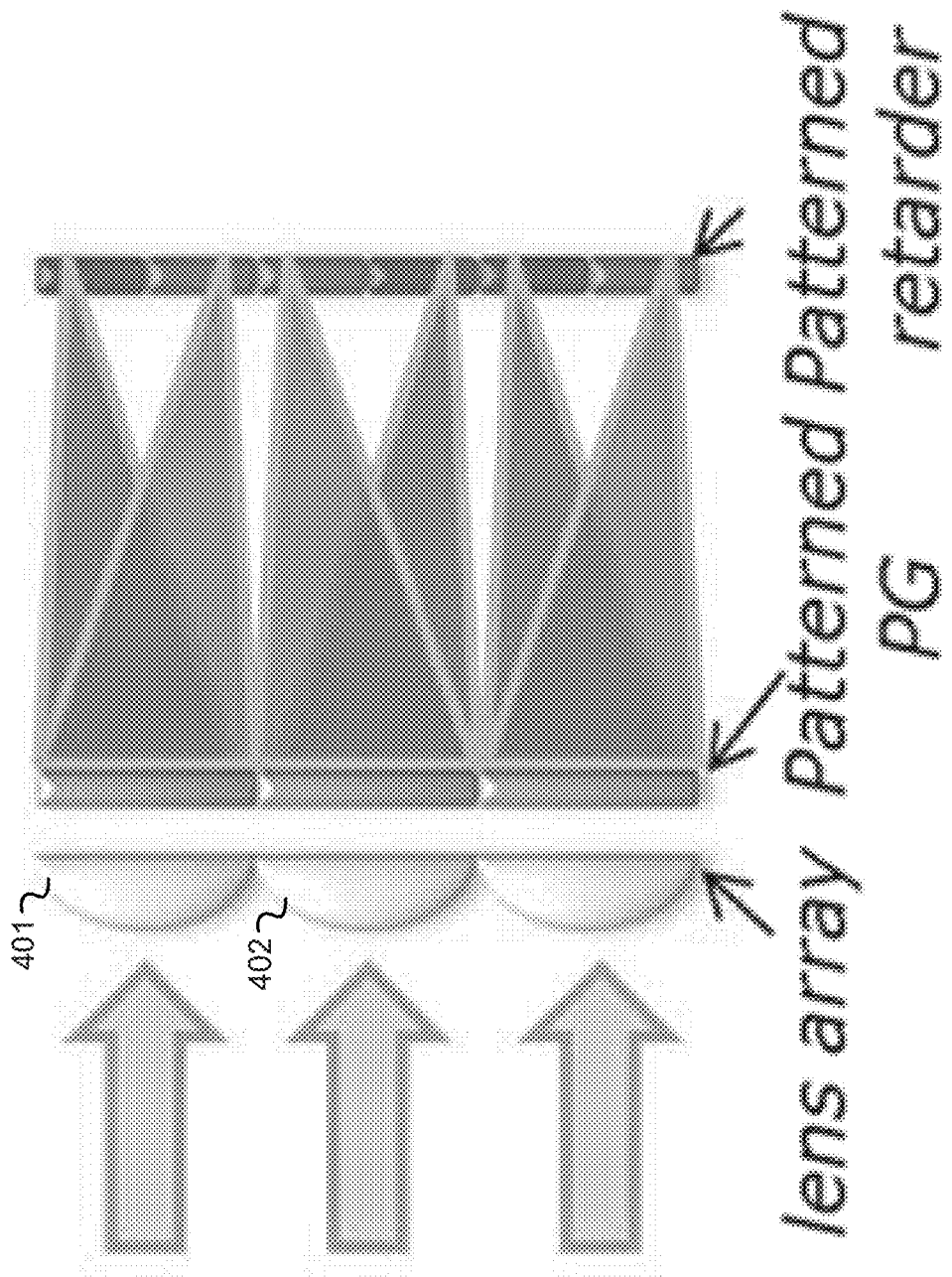
FIG. 4 is an illustrative diagram showing a polarization conversion system including a lens array in an exemplary embodiment.

In a further embodiment, to address a situation where input light is non-polarized light that is not well collimated, a lens array is added in front of the patterned polarization grating as depicted in FIG. 4. The lens array includes multiple lenses (401 and 402), each covering either one left hand PG domain or one right hand PG domain. By combining the lens array and the patterned polarization grating together, input non-polarized light will be converted into left circular beam and right circular beam having separate focusing points. In the example depicted by FIG. 4, the lens array and patterned polarization grating separate pairs of beams with different polarization states and focus them into corresponding domains on a patterned retarder (e.g., a patterned quarter or half wave plate).

The polarization converter having the lens array and patterned polarization grating and patterned retarder as shown in FIG. 4 can be used in a polarization conversion system (PCS) for Liquid Crystal on Silicon (LCOS) applications. It will be appreciated that LCOS is a relatively new technology. An LCOS projector requires light input to an LCOS chip to be linear polarized, and in a conventional LCOS projector, a polarizer (with a maximum efficiency of 50%) or a PCS is used to provide linear polarized light beam to be projected to the LCOS chip. An exemplary conventional PCS system uses a pair of fly-eye lens (FEL) arrays with Polarized Beam Splitter (PBS) arrays, together with wire grid polarizer arrays, which results in complex structure and high cost for the PCS.

According to exemplary embodiments of the present invention, a PCS for LCOS is provided with lens arrays and a patterned polarization grating having left and right hand polarization grating domains as discussed above with respect to FIGS. 1-3, and, as discussed above, the patterned polarization grating separates input non-polarized light into domains of right hand and left hand circular polarized output light at a certain distance away from the patterned polarization grating.

In an exemplary embodiment of a PCS for LCOS using the structure depicted in FIG. 4 with a pair of FEL arrays, input light passes through a first FEL array, is converted into left hand and right hand circular polarized light by a patterned polarization grating, and a patterned retarder (e.g., a patterned quarter wave plate) converts the circular polarized light into linearly polarized light that goes into the other FEL array (not pictured in FIG. 4). The efficiency of such a device was determined to be around 90% according to simulation results.

Figure 5:
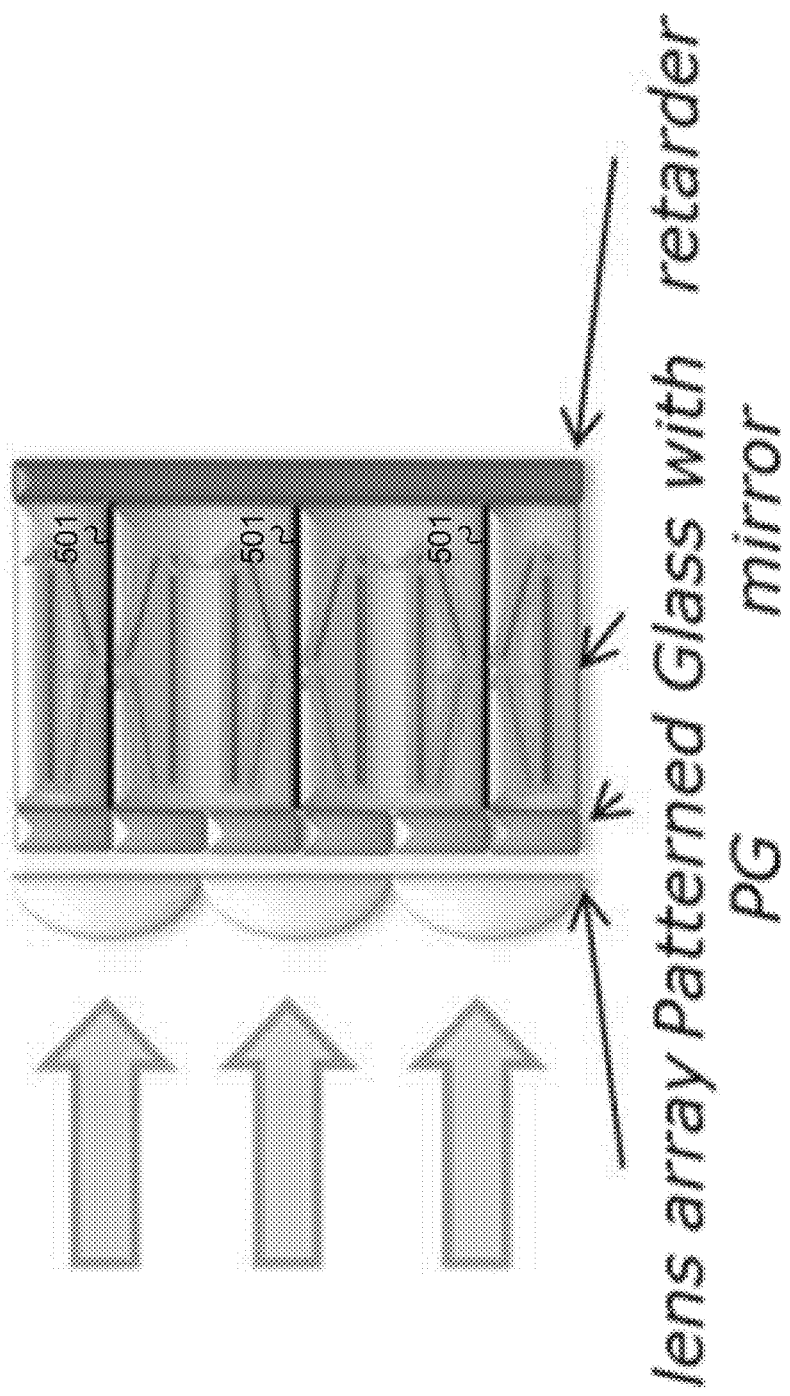
FIG. 5 is an illustrative diagram showing a polarization conversion system including a lens array and mirrors in an exemplary embodiment.

Turning now to FIG. 5, another embodiment of a polarization converter is shown where the lens array includes multiple lenses with each covering both one left hand polarization grating domain and one right hand polarization grating domain. A mirror array (501) with each mirror positioned perpendicular to the patterned polarization grating at the boundary line between domains of the patterned polarization grating, is configured to reflect beams having one of left and right hand circular polarization states so as to convert the beams having one of left and right hand circular polarization states to beams having the other of the left and right hand circular polarization states.

Figure 6:
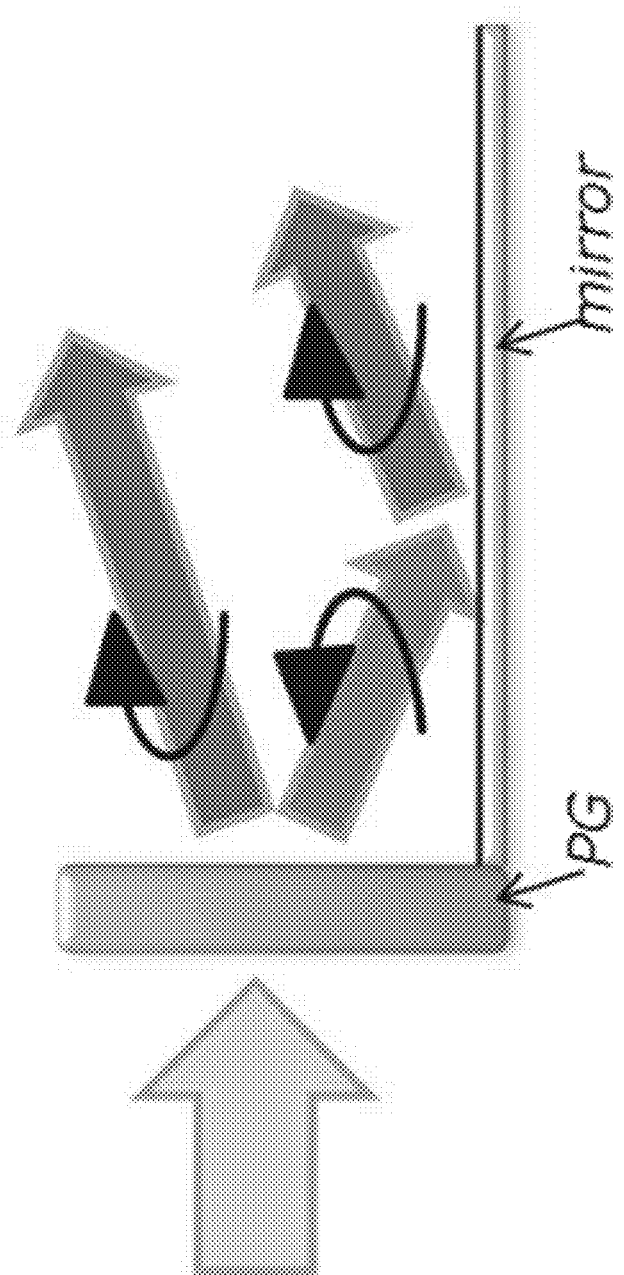
FIG. 6 is an illustrative diagram showing a part of the polarization conversion system depicted in FIG. 5.

Input light passes through the lens array, is converted into left hand and right hand circular polarized light by a patterned polarization grating, and a retarder (e.g., a quarter wave plate) converts the circular polarized light into polarized light of a different polarization state. The mirrors of the mirror array traverse the space between the patterned polarization grating and the retarder and convert one circular polarization state to the other as illustrated in FIG. 6. The substrate for the reflective mirrors may be comprised of glass arranged as a glass substrate array, which helps reduce the divergence of light after the light passes through the polarization grating (since divergence of light in glass is smaller than divergence of light in air due to the higher refractive index of glass). The structure depicted in FIGS. 5-6 is able to achieve efficiencies of higher than 90%, and with a relatively compact structure. Further, it will be appreciated that an unpatterned retarder may be used in the structure depicted in FIG. 5.

An exemplary embodiment of a PCS for LCOS uses the structure depicted in FIG. 5 with a pair of FEL arrays, with one FEL array on either side of the polarization grating together with the mirror array and retarder.

The polarization converters depicted in FIGS. 4 and 5 include a polarization grating with both left hand and right hand alignment domains similar to FIGS. 1-3. The left hand and right hand alignment domains can have the same structure except that they are mirror images of each other—i.e., rotated by 180 degrees. In other words, given the same input non-polarized light, the output light from a right hand alignment domain is the same as the output light of the left hand polarization grating in a plane except that they are rotated 180 degrees relative to each other. When non-polarized light (whether collimated or not collimated) incidents into the polarization converter, it will first be converted into left hand and right hand circular polarized light with mirrored propagating directions by the patterned polarization converter. The lens arrays are designed such that light beams with different polarization states will be focused at different focal points in order to make sure they are totally separated. The patterned or unpatterned retarder may be a quarter wave plate that converts the circular polarized light to linear polarized light, so the final output light from the polarization converter is linear polarized light.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A polarization converter, comprising:
   a patterned polarization grating comprising multiple domains of a first type and multiple domains of a second type;
   wherein each of the multiple domains of the first type is configured to diffract incident non-polarized light into left hand circular polarized beams at a first angle relative to the patterned polarization grating and right hand circular polarized beams at a second angle relative to the patterned polarization grating, and each of the multiple domains of the second type is configured to diffract incident non-polarized light into left hand circular polarized beams at the second angle relative to the patterned polarization grating and right hand circular polarized beams at the first angle relative to the patterned polarization grating;
   wherein left hand circular polarized beams from a first domain of the patterned polarization grating converge with left hand circular polarized beams from a second domain of the patterned polarization grating adjacent to the first domain at a distance away from the patterned polarization grating;
   wherein right hand circular polarized beams from the second domain of the patterned polarization grating converge with right hand circular polarized beams from a third domain of the patterned polarization grating adjacent to the second domain at the distance away from the patterned polarization grating; and
   wherein the polarization converter further comprises:
   a patterned retarder, comprising retarder domains of a first type corresponding to left hand circular polarized beams and retarder domains of a second type corresponding to right hand circular polarized beams, wherein the patterned retarder is positioned at the distance away from the patterned polarization grating.

2. The polarization converter of claim 1, wherein the multiple domains of the first type of the patterned polarization grating and the multiple domains of the second type of the patterned polarization grating are uniformly distributed across the patterned polarization grating.

3. The polarization converter of claim 1, wherein the left hand circular polarized beams diffracted at the first angle relative to the patterned polarization grating and the right hand circular polarized beams at the second angle relative to the patterned polarization grating propagate in directions relative to one another that are mirrored about an axis orthogonal to the patterned polarization grating.

4. The polarization converter of claim 1, wherein the patterned retarder domains of the first type are patterned quarter wave plate domains and the patterned retarder domains of the second type are patterned quarter wave plate domains orthogonal to the patterned retarder domains of the first type.

5. The polarization converter of claim 1, wherein the patterned retarder domains of the first type are patterned half wave plate domains.

6. The polarization converter of claim 1, further comprising:
a lens array having multiple lenses, wherein each lens corresponds to a domain of the patterned polarization grating.

7. The polarization converter of claim 1, further comprising:
a lens array having multiple lenses, wherein each lens corresponds to two adjacent domains of the patterned polarization grating.

8. The polarization converter of claim 7, further comprising:
a mirror array comprising mirrors perpendicular to the patterned polarization grating with each mirror positioned at the boundary line between domains of the patterned polarization grating, configured to reflect beams having one of left and right hand circular polarization states so as to convert the beams having one of left and right hand circular polarization states to beams having the other of left and right hand circular polarization states.

9. The polarization conversion system of claim 8, further comprising:
a glass substrate array on which the mirrors are deposited.

* * * * *